Patented Dec. 30, 1924.

1,521,127

UNITED STATES PATENT OFFICE.

WILLIAM FREDERICK REMUS, OF RANGATAUA, NEW ZEALAND, ASSIGNOR OF ONE-SIXTH TO ALEXANDER EDMUND MACREDIE, ONE-SIXTH TO CHARLES FREDERICK CORK, THREE-TWELFTHS TO ALAN MACKENZIE McNEILL, AND THREE-TWELFTHS TO WILLIAM JOHN ABBOTT, ALL OF AUCKLAND, NEW ZEALAND.

PROCESS FOR THE PREPARATION OF MEAT POWDERS.

No Drawing.   Application filed May 5, 1921.   Serial No. 466,995.

*To all whom it may concern:*

Be it known that I, WILLIAM FREDERICK REMUS, subject of the King of Great Britain, residing at Rangataua, Waimarino, in the Dominion of New Zealand, have invented a new and useful Process for the Preparation of Meat Powders, of which the following is a specification.

This invention relates to an improved process devised for the preparation of meat powder or flour. This process provides for the said powder or flour being produced from the lean meat of sheep or cattle in such a manner that practically the whole of its moisture constituents are removed, leaving a powder that consists almost entirely of the nutrimental portions of the meat. Such powder or flour, as produced by this process, will be very rich in its protein values as compared with ordinary meat and the various forms of meat extract on the market.

The powder or flour is useful for a large number of purposes in the culinary and medicinal arts, as for instance in domestic cooking, meat canning, manufacture of savouries, sauces etc., the making of medicinal tonics and the like. The process by which it is produced also will insure of it keeping fresh under all normal conditions for a considerable period of time.

According hereto the said process consists in a series of treatments under which the meat cut into small blocks is subjected to alternate and repeated heating, squeezing or pressing, and mincing operations and to final drying, grinding and sieving operations, to produce the powder, and to separate and save the meat juice as byproducts.

The process is carried out in the following manner:—

The meat is taken from a carcass that has thoroughly set and cooled, and is first boned and has all kidney or gall fat removed from it, and is then cut into pieces or roughly minced. This meat is placed in suitable trays and spread evenly therein to a depth of about three inches and the trays placed within an oven in which a heat of 135° Fah. is maintained, and allowed to remain there for about two hours. After this period has elapsed, the trays are removed and the meat is subjected to suitable squeezing or pressing action by means of which the juices that have been loosened by the partial cooking are expressed and caught. The meat is then again broken up by mincing, and replaced in the oven for another period of two hours, the temperature of the oven being maintained at 135° Fah. After this the meat is or pressure action and the juices expressed and caught, then the meat is again broken removed and again subjected to squeezing up and replaced in the oven and kept there, still under a temperature of 135° Fah., until the meat is completely dried. This dried meat is then removed, is allowed to become thoroughly cold, and is afterwards ground in suitable grinding machines and strained through fine sieves to remove the sinews and fibres therefrom, and the powder or flour then packed into approved receptacles for storage or sale.

It is advisable during the final drying treatment of the meat (which in the majority of cases will extend over a period of about twenty hours) that it should be removed from the oven at regular periods, say every four hours, and stirred or mixed.

As a byproduct, the first lot of juices expressed from the meat may be strained and brought to a boiling temperature. It will then curd and this curd, when strained off through a fine sieve and subsequently dried, may be used for pig and fowl food. The remaining liquor may then be evaporated to about half and used for incorporation in beef and iron wines, extracts etc., with good results.

As further byproducts the second lot of juices extracted from the meat, which will generally consist of the gelatine and fine fats, is allowed to cool and has the fat skimmed from it. It is then brought to boiling temperature and allowed to cool and set, when it may be worked into extracts, tabloids, etc. The fat skimmed off may also be used for the various purposes in which the finer meat fats are generally employed.

The sinews and fibres and like matters separated from the meat powder during the final and sieving process may also be used by boiling to obtain the gelatine, or as fowl, etc., food.

I claim:—

1. The process of making meat powder which comprises first reducing meat to small pieces, heating the meat at approximately 135° F. until some of the juices are liberated, then squeezing out the juices thus liberated, mincing the squeezed meat, then heating the minced meat at approximately 135° F. until it is thoroughly dry, and finally pulverizing or grinding the dried meat.

2. The process of making meat powder which comprises first reducing meat to small pieces, heating the meat at approximately 135° F. until some of the juices are liberated, then squeezing out the juices thus liberated, mincing the squeezed meat, again heating the meat at approximately 135° F. until further juices are liberated, then squeezing out such juices, again mincing the meat, heating the meat at approximately 135° F. for a sufficient period to completely dry the same and finally grinding or pulverizing the dry meat.

In testimony whereof, I affix my signature.

WILLIAM FREDERICK REMUS.

Witnesses:
DAVID BROWN HUTTON,
ALAN MACKENZIE MCNEILL.